United States Patent [19]

Hehl

[11] Patent Number: 5,061,167
[45] Date of Patent: Oct. 29, 1991

[54] INJECTION MOLDING MACHINE INCLUDING A CUTTING UNIT

[76] Inventor: Karl Hehl, Arthur-Hehl-Str. 32, D-7298 Lossburg 1, Fed. Rep. of Germany

[21] Appl. No.: 406,808

[22] Filed: Sep. 13, 1989

[30] Foreign Application Priority Data

Sep. 13, 1988 [DE] Fed. Rep. of Germany ....... 3831129

[51] Int. Cl.$^5$ .............................................. B29C 45/38
[52] U.S. Cl. .................................... 425/188; 198/835; 241/101.4; 264/37; 425/190; 425/192 R; 425/216; 425/301; 425/306
[58] Field of Search ................................ 198/834, 835; 241/101.2, 101.4; 264/37, 334; 425/182, 188, 184, 190, 185, 192 R, 186, 225, 290, 291, 294, 301, 306, 139, 554, 556, 216, 217, 542

[56] References Cited

U.S. PATENT DOCUMENTS

| 3,776,675 | 12/1973 | Veneria | 425/139 |
| 4,321,027 | 3/1982 | Stoehr et al. | 425/207 |
| 4,608,008 | 8/1986 | Hehl | 425/556 |

FOREIGN PATENT DOCUMENTS 3126520 1/1983 Fed. Rep. of Germany .
3637612 5/1987 Fed. Rep. of Germany .

Primary Examiner—Timothy Heitbrink
Attorney, Agent, or Firm—Spencer & Frank

[57] ABSTRACT

An injection molding machine has a sorting device which is disposed under the injection mold and includes a swivel plate, which is pivotally movable by a motor-driven swivel drive to two mutually oppositely inclined positions for a delivery of usable moldings and for a delivery of rejects and sprues, respectively. In the position for a delivery of usable moldings, the delivery end of the swivel plate is disposed over an arrangement for receiving the usable moldings (belt conveyor). In the position for a delivery of rejects and sprues, the delivery end of the swivel plate is disposed over a disintegrator. The disintegrator includes a cutting mechanism, which constitutes a unit, which is removable out of the machine pedestal, and a motor-and-transmission block, which is disposed outside the vertical projection of the cutting mechanism. The sorting device is incorporated in a sorting unit, which is removable out of the machine pedestal.

11 Claims, 9 Drawing Sheets

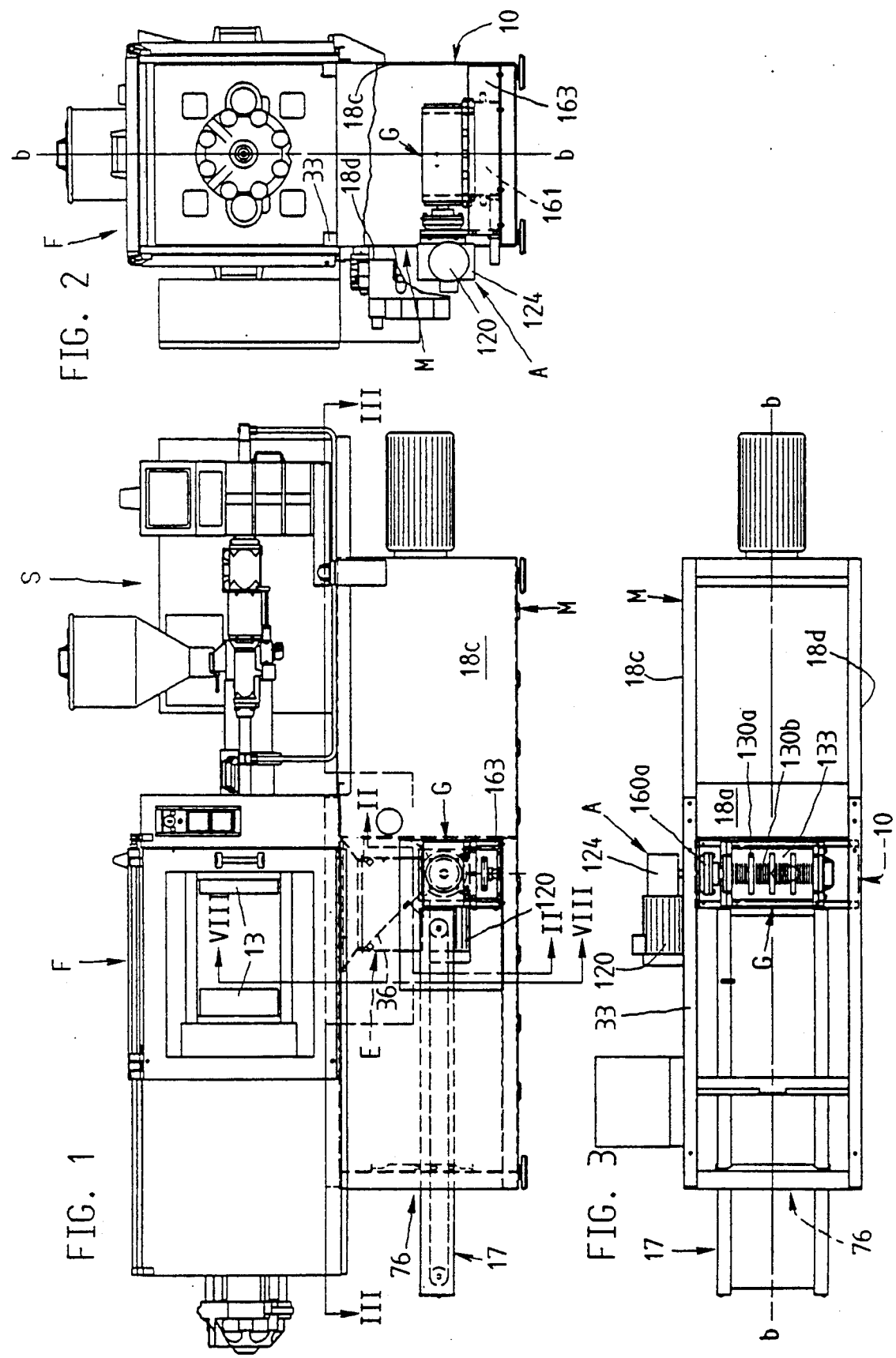

INJECTION MOLDING MACHINE INCLUDING A CUTTING UNIT

BACKGROUND OF THE INVENTION

1. Field of the Invention

This invention relates to an injection molding machine comprising an injecting unit and a clamping unit, which are supported on a machine pedestal which has an approximately rectangular vertical projection, The machine also comprises an injection mold for consecutively ejecting usable moldings, rejects and sprues, sorting means, which are disposed under the injection mold and comprise a swivel plate, which is pivotally movable by means of a motor-driven swivel drive to two mutually oppositely inclined positions, in which the usable moldings, on the one hand, and the rejects and sprues, on the other hand, slip down on the swivel plate in mutually opposite directions, There are further provided receiving means, which extend under the delivery end of said swivel plate when it is in position for a delivery of usable moldings, and comprising a disintegrator, which includes a drive motor, a transmission, a cutting mechanism having a drive shaft, and a container for disintegrated material, wherein the delivery end of said plate is disposed over said disintegrator when said plate is in its position for a delivery of sprues.

2. Description of the Prior Art

A known injection molding machine of the above outlined kind is disclosed in Published German Application 3637612 and in the corresponding U.S. patent application Ser. No. 116 218 and comprises a belt conveyor and a disintegrator, which consist of separate units and can be removed from the injection molding machine. But the functional elements of the sorting means are individually and permanently integrated in the machine pedestal because there is only a confined space between the injection mold and the disintegrator particularly in small injection molding machines. The sprues must be horizontally transported from the sorting means before they can be received by the cutting mechanism. It is also known from Published German Application 3126520 that the consecutively ejected moldings, on the one hand, and sprues and rejects, on the other hand, can be directed to different collecting containers by means of a sorting flap, which is actuated by drive means, which are permanently installed in the injection molding machine. In that case the sorting flap has a guiding function only in one guiding position and the sorting means and the collecting containers occupy the entire space below the injection mold.

In another known injection molding machine (U.S. Pat. No. 3,776,675) the sorting means also occupy the entire space in the machine frame under the injection mold. The guide flap causes, the moldings, on the one hand, and the sprues, on the other hand, to move on sloping surfaces directly out of the machine pedestal.

It is also known from U.S. Pat. No. 4,608,008 to provide a belt conveyor unit, which comprises a belt conveyor, a frame and drive means and which is removably mounted in the machine pedestal and is so arranged that the moldings are conveyed by said belt conveyor out of the machine pedestal at one end thereof on a path which is parallel to the longitudinal vertical plane of symmetry of the injection molding machine. But a separation of rejects from the usable moldings is not contemplated and is not possible.

In a relatively large injection molding machine of a comparable kind the rejects and the usable moldings fall out of the mold in spaced apart regions (U.S. Pat. No. 4,321,027, column 1, lines 18 to 29 and column 2, lines 32 to 38). The rejects fall into a disintegrator, which can be moved out of the machine pedestal.

SUMMARY OF THE INVENTION

It is an object of the invention so to improve an injection molding machine which is of the kind described first herinbefore that various financial resources of the potential customers and various production processes employed by them can better be taken into account because injection molding machines having different degrees of automation can economically be manufactured and can be converted to a higher degree of automation without a large expenditure of assembling work.

That object is accomplished in that the disintegrator comprises a cutting mechanism, which is incorporated in a unit which can be removed out of the machine pedestal, and a motor-transmission block, which is incorporated in a motor-transmission unit and is disposed outside the vertical projection of the cutting mechanism, and the sorting means are incorporated in a sorting unit which can be removed out of the machine pedestal.

In such an arrangement the handling of the parts of the machine will greatly be simplified. When the injection molding work is to be changed for the production of moldings which have a different shape or a different color, hardness, toughness and the like and that change requires the use of a different cutting mechanism or requires a cleaning of the cutting mechanism, it will no longer be necessary to remove the entire disintegrator but it will be sufficient to remove the cutting unit from the machine pedestal with a small amount of work. That advantage will also be afforded when a repair is required.

In such an arrangement it will also be possible, particularly in a small injection molding machine, to accomodate the sorting means, the belt conveyor and the disintegrator in the machine pedestal in such an arrangement that cutting mechanisms which are suitable for a cutting of specific moldings in dependence on their shape, hardness and toughness can be used, e.g., cutting mechanisms operating at a relatively low speed and having a large overall axial length because the associated drive motor is disposed outside the vertical projection of the cutting mechanism.

Because the sorting means and the cutting mechanism constitute respective units which can be removed from the machine pedestal, the downtimes will be much shorter as each unit can quickly be replaced. Besides, a customer who has relatively small financial resources can first purchase an injection molding machine having the lowest degree of automation without sorting means, conveying means and disintegrator but having only a collecting bin and as his financial resources increase that machine can be equipped in consecutive stages with said means.

Machines having progressively increasing degrees of automation can be used by the customer, e.g., for the following production processes:

Simple collection of unsorted moldings in a container;

delivery of unsorted moldings by conveying means (belt conveyor);

sorting of moldings and delivery of the usable moldings by the belt conveyor and collection of the rejects and sprues in a container;

sorting of moldings, delivery of the usable moldings and disintegration of the rejects and sprues.

The arrangement in accordance with the invention affords advantages also in production because the sorting means consist of a functional unit which can be tested for operability out of the injection molding machine before said unit is inserted into the machine pedestal or after it has been serviced or repaired.

The sorting means can be preassembled outside the injection molding machine to constitute an independently operable unit, which can be inserted in a simple manner into the machine pedestal. The total assembling work which will be involved will be significantly less than in a manufacturing process in which the individual parts of the sorting means must individually be installed in the machine pedestal. Finally, the sorting unit may selectively be installed, with little assembling work, in the machine pedestal in such a manner that the pivotal axis of the sorting means is either parallel or at right angles to the vertical longitudinal plane of symmetry of the injection molding machine.

In an improved embodiment the cutting mechanism is coupled to the motor-transmission unit by a plug coupling and is adapted to be removed from the machine pedestal through an exit opening and is arranged to be uncoupled from the motor-transmission unit as the cutting unit is thus removed, and the cutting unit is symmetrical to a vertical longitudinal center plane of the sorting unit. In that embodiment the cutting unit can be associated with the sorting unit within a small space. Rejects and sprues need not to be transversely conveyed from the sorting means but will directly fall from the sorting means into the cutting mechanism so that the cutting mechanism may have a simple design, which requires only a small space, and will automatically be coupled to and uncoupled from the associated motor-transmission unit.

BRIEF DESCRIPTION OF THE DRAWING

FIG. 1 is a diagrammatic side elevation showing the injection molding machine.

FIG. 2 is a rear elevation showing the injection molding machine of FIG. 1 without the belt conveyor.

FIG. 3 is a horizontal sectional view taken on line III—III in FIG. 1.

DETAILED DESCRIPTION OF THE PREFERRED EMBODIMENTS

Figure 4:
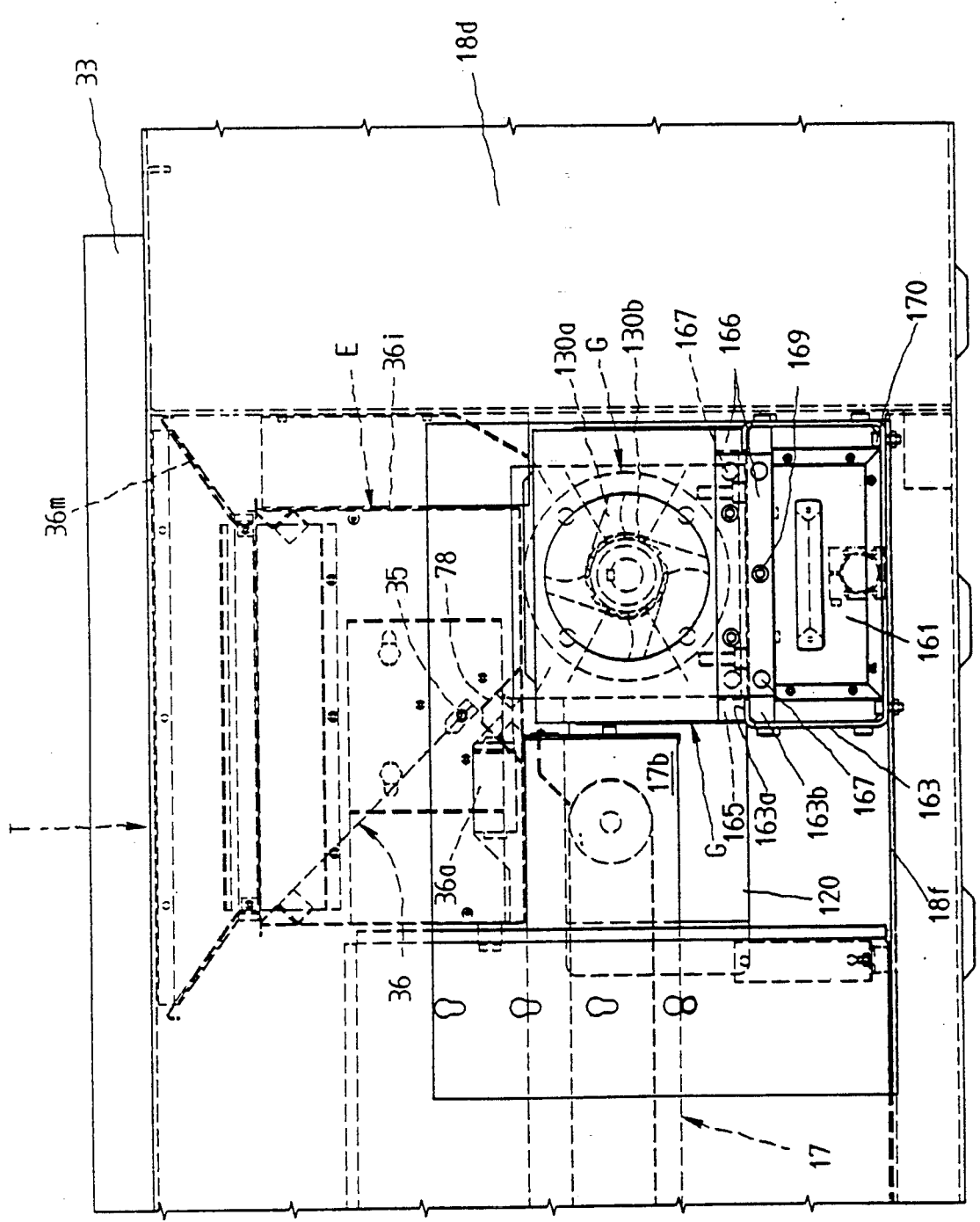
FIG. 4 is an enlarged fragmentary view showing a portion of FIG. 1.

The invention will now be described with reference to two illustrative embodiments shown in the drawings.

In the injection molding machine an injecting unit S is supported by a sheet steel machine pedestal M, which is U-shaped in cross-section and has vertical longitudinal side walls 18c, 18d, which constitute the legs of the U and have inturned top edge flanges 18e, which are provided with track rails 33.

Moldings which have been detected by the computer of the injection molding machine because one or more of their parameters is outside a predetermined range, are described herein as rejects.

Figure 6:
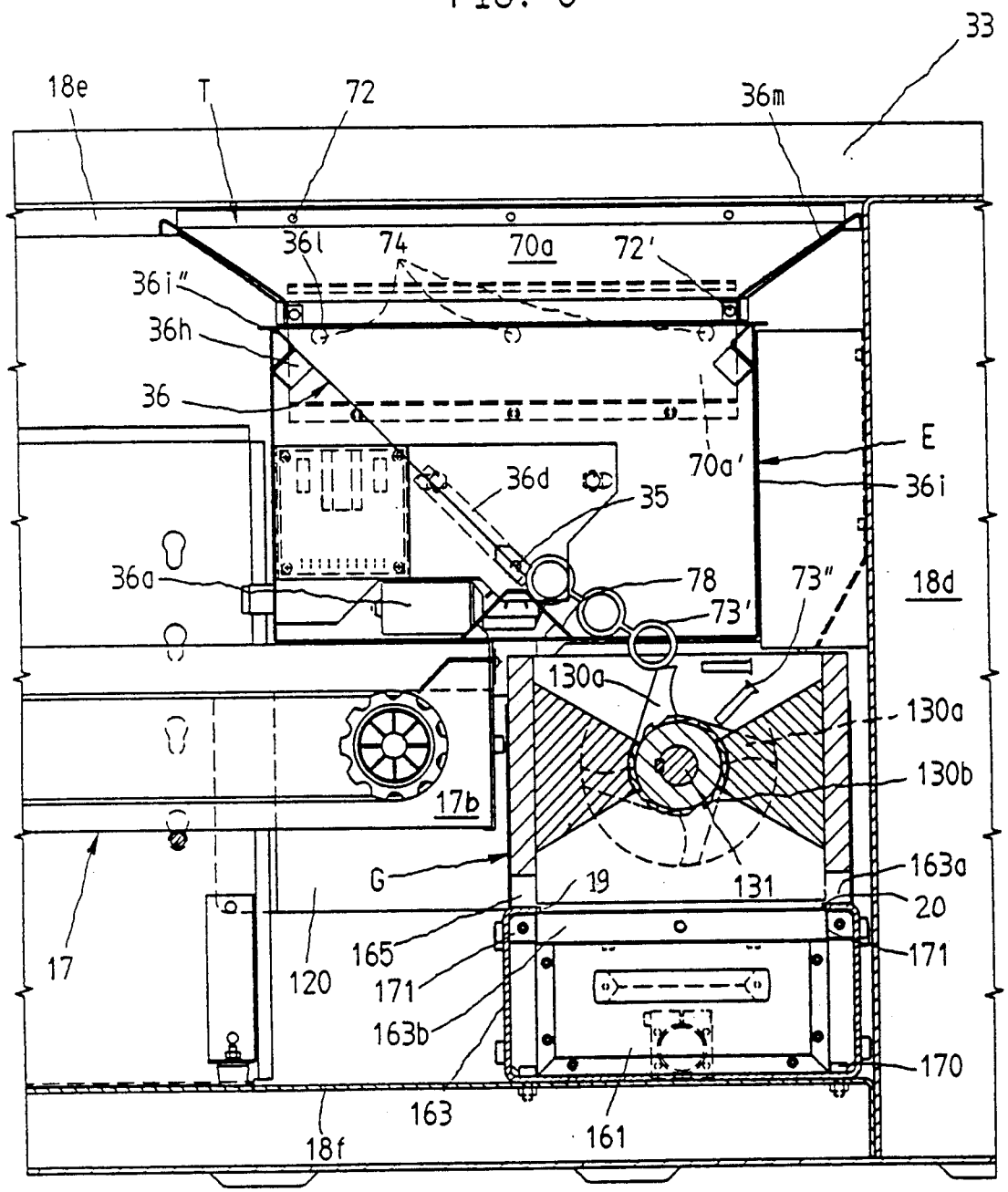
FIGS. 6 and 7 are sectional views taken on line VI—VI in FIG. 8 with the sorting unit in respective positions for a delivery of rejects and sprues and for a delivery of usable moldings.
Figure 7:
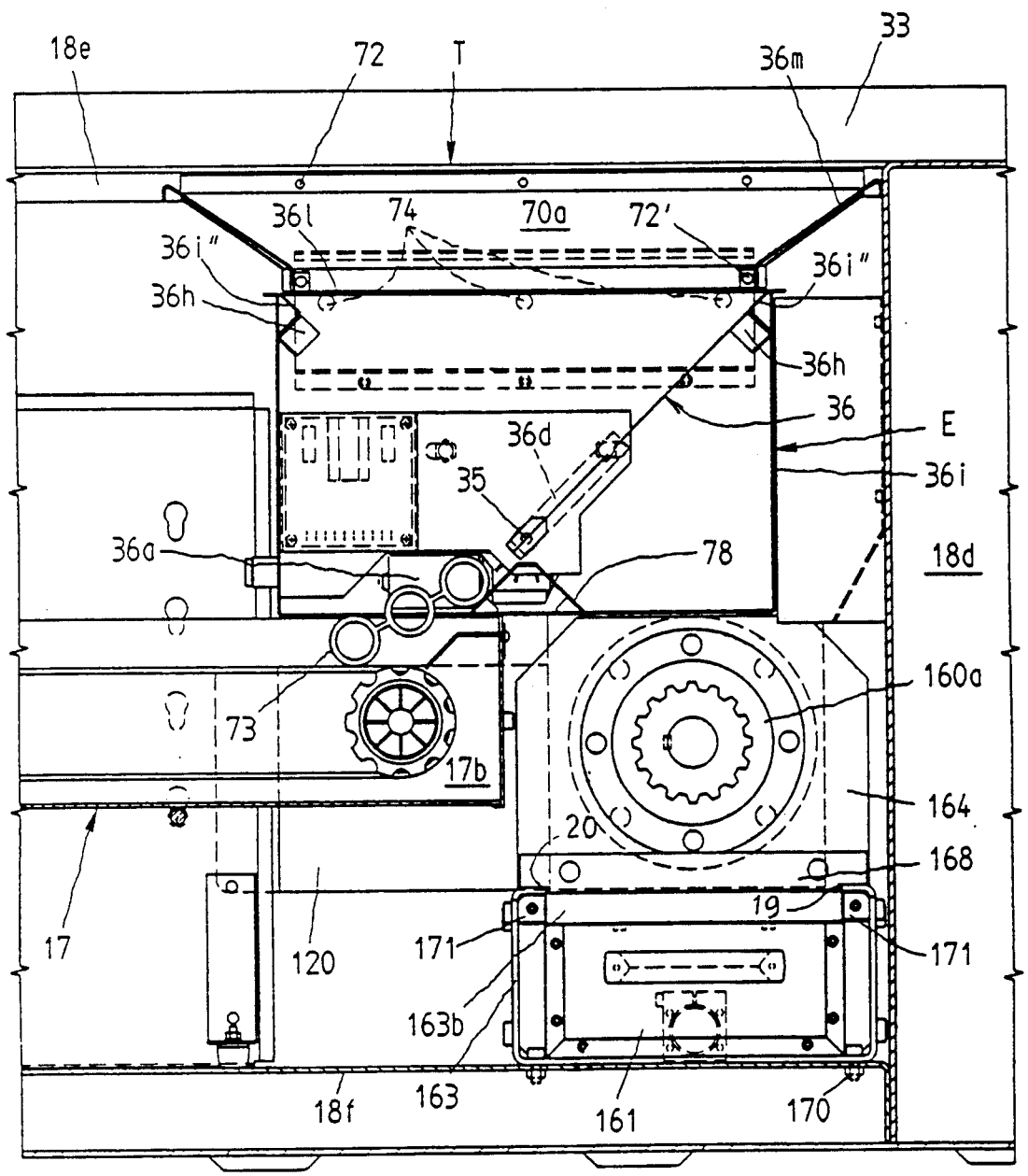
Figure 8:
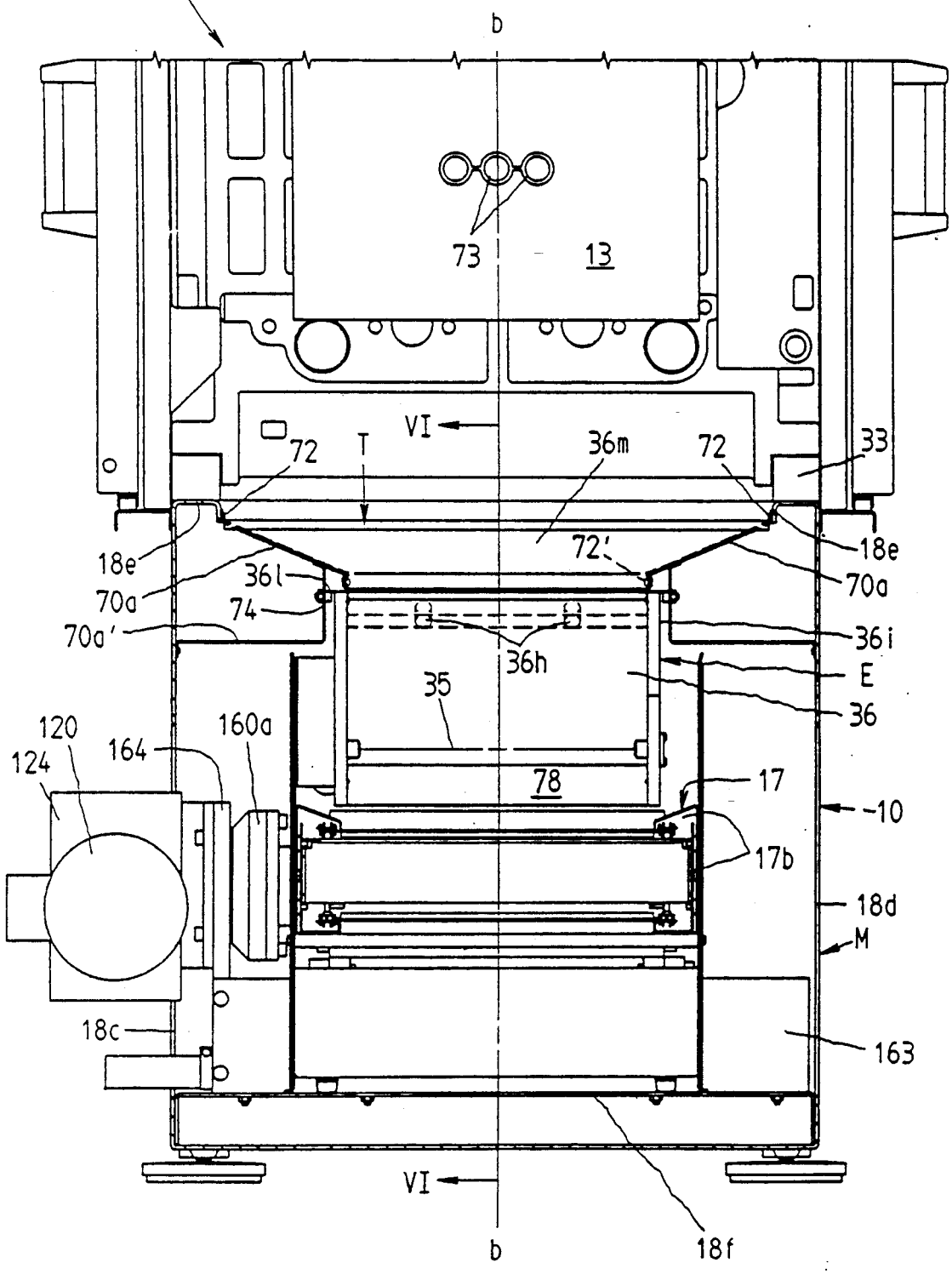
FIG. 8 is a sectional view taken on line VIII—VIII in FIG. 1.
Figure 9:
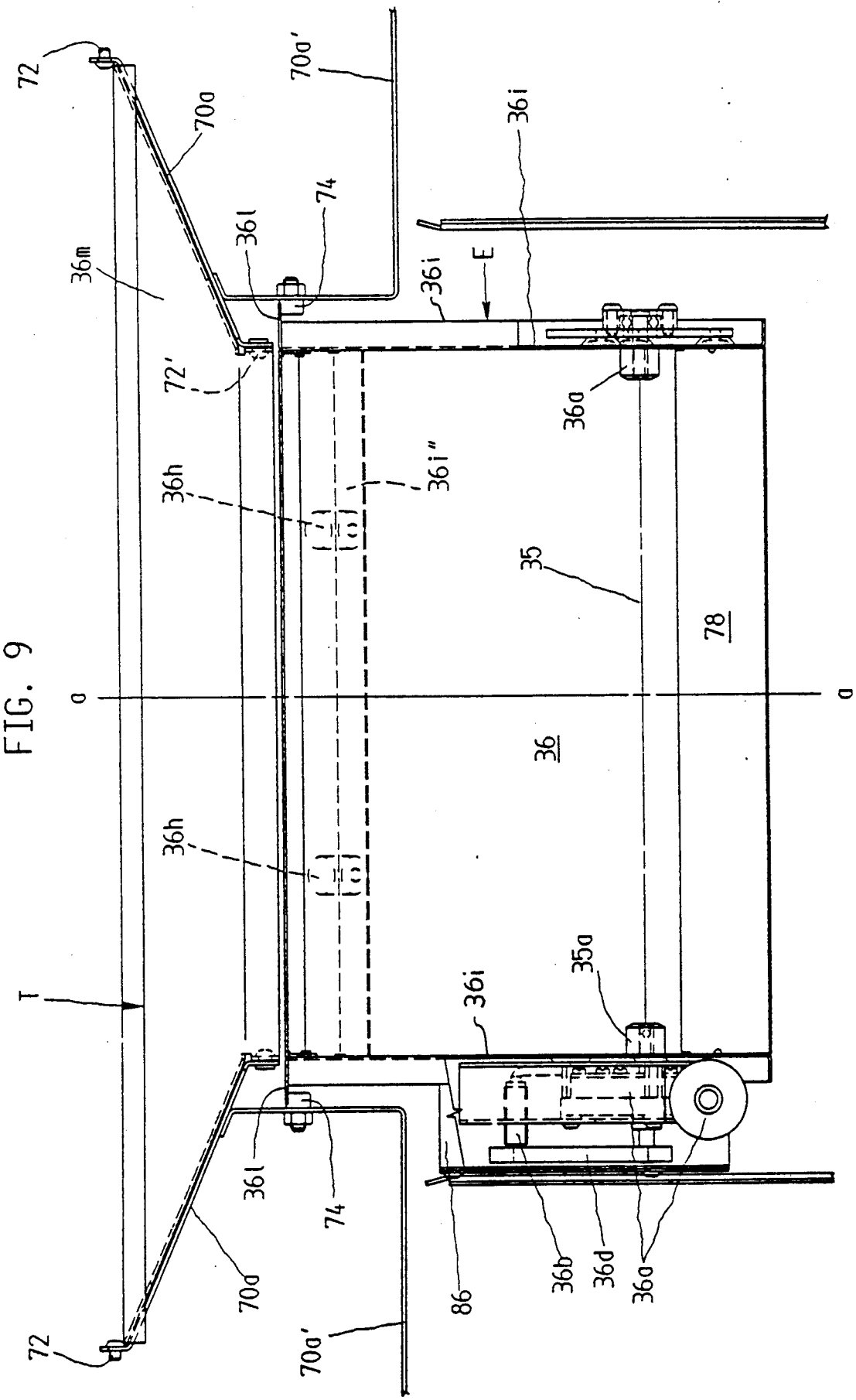
FIG. 9 is a fragmentary view showing a portion of FIG. 8 with the housing of the sorting unit partly cut open.
Figure 10:
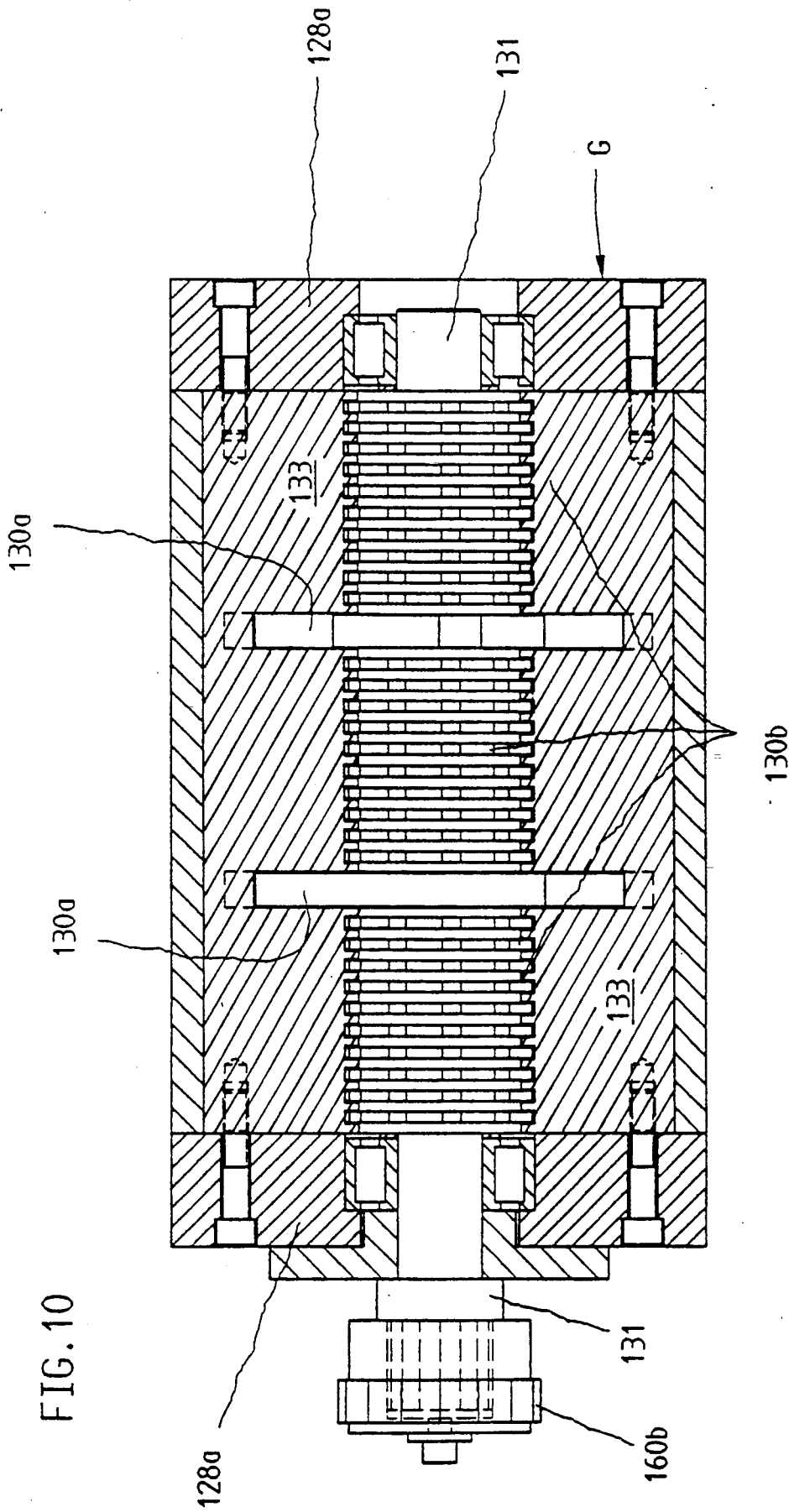
FIG. 10 is a top plan view showing the cutting mechanism of the disintegrator partly in a sectional view taken on a plane through the axis of the cutting mechanism.

The machine also comprises a clamping unit F, which is shown in FIG. 1 and supported by the machine pedestal M. The clamping unit comprises an injection mold 13, which is provided with an ejector for consecutively ejecting usable moldings 73 and rejects 73', on the one hand, and sprues 73" (FIG. 6) on the other hand. Under the injection mold 13, sorting means are disposed in the machine pedestal M and comprise a swivel plate 36 which is non-rotatably connected to a horizontal swivel shaft 35 and has slide faces on both sides. The swivel plate 36 serves to separate the rejects 73' and the sprues 73" from the usable moldings 73. The sorting mechanism is incorporated in a sorting unit E and also comprises a motor-operated swivel drive 36a,36d for swiveling the plate in intervals of time between a first inclined position for a delivery of usable moldings 73 and a second inclined position for a delivery of rejects 73' and sprues 73". Said first position is shown in FIG. 7 and said second position is shown in FIGS. 1, 4, 6. In the inclined positions of the swivel plate 36 the usable moldings or rejects or sprues slide on the then upwardly facing slide face of the swivel plate 36 in mutually opposite directions and are thus separated from each other. The sorting unit E comprises a housing 36i and can be removed as an independently operable unit from the machine pedestal M and may be arranged in the parallelepipedic machine pedestal M with the swivel shaft 35 extending at right angles to the longitudal vertical plane of symmetry b—b of the injection molding machine. The housing 36i comprises two parallel vertical walls 36i', which carry the swivel bearings 35a for the swivel shaft 35, two section bars 36i" which connect the walls 36i' at their top, and an angle plate 78, which connects the walls 36i' at the bottom. The swivel plate 36 has a major portion extending above the swivel shaft 35. The slide surfaces of the swivel plate 36 are continued by the top surfaces of the angle plate 78, which is disposed under the swivel shaft 35 and is symmetrical to the vertical plane which contains the swivel shaft 35. Each wall 36i' is formed at its top edge with a horizontal supporting flange 36 l. The supporting flanges 36 l support the sorting unit E on stationary supporting elements 74. As is particularly apparent from FIG. 9 in conjunction with FIGS. 6 to 8, said supporting elements 74 are arranged in respective rows on vertical legs of supporting plates 70a', which are firmly connected to a stationary funnel T. The funnel T is constituted by sheet metal elements 70a, 36m, which are connected by fasteners 72', and is secured by additional fasteners 72 to the flanges 18e of the machine pedestal M. The swivel plate 36 is supported on supporting elements 36h.

Figure 5:
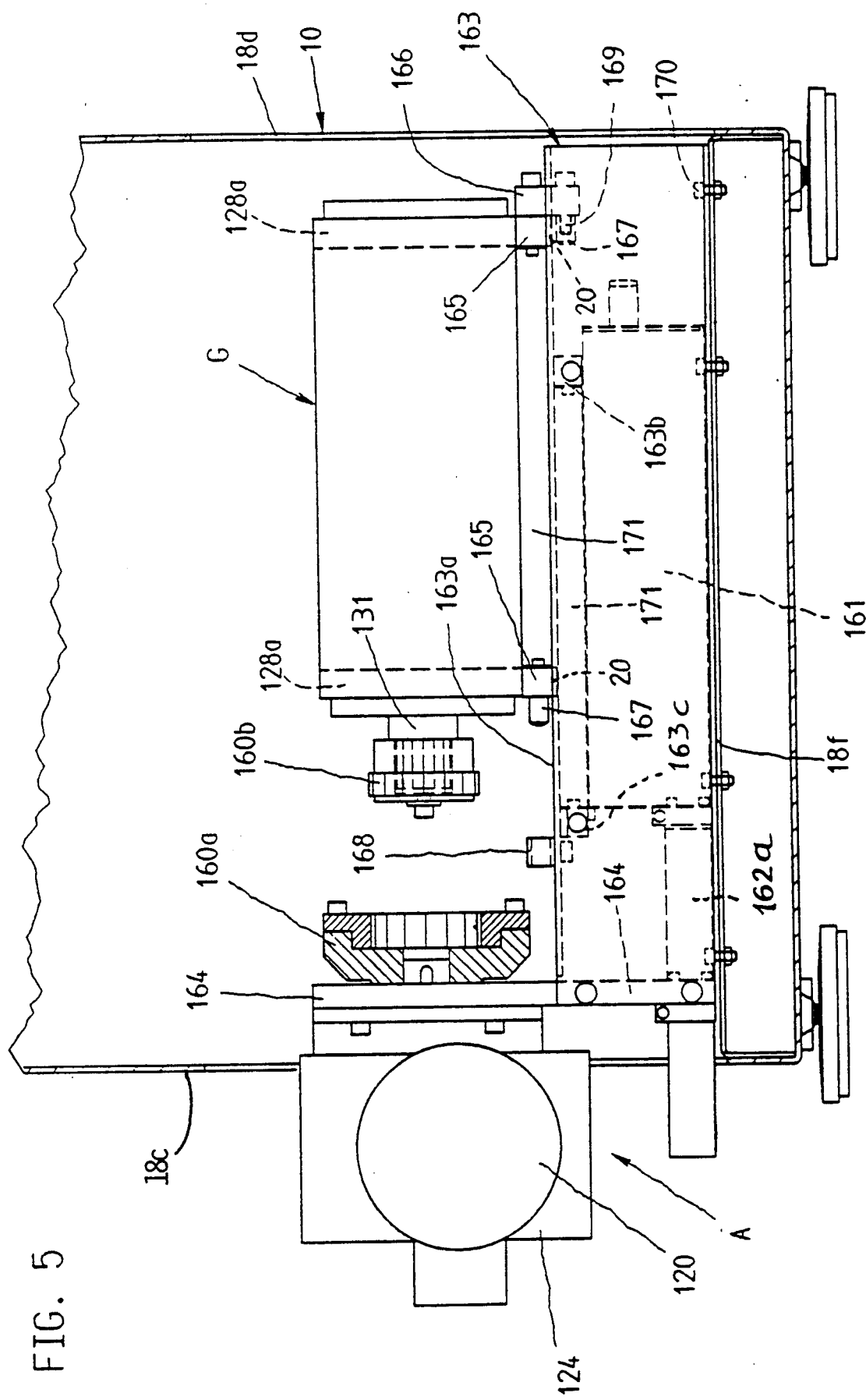
FIG. 5 is an enlarged fragmentary view showing a portion of FIG. 2 with the cutting mechanism uncoupled from the drive motor.
Figure 11:
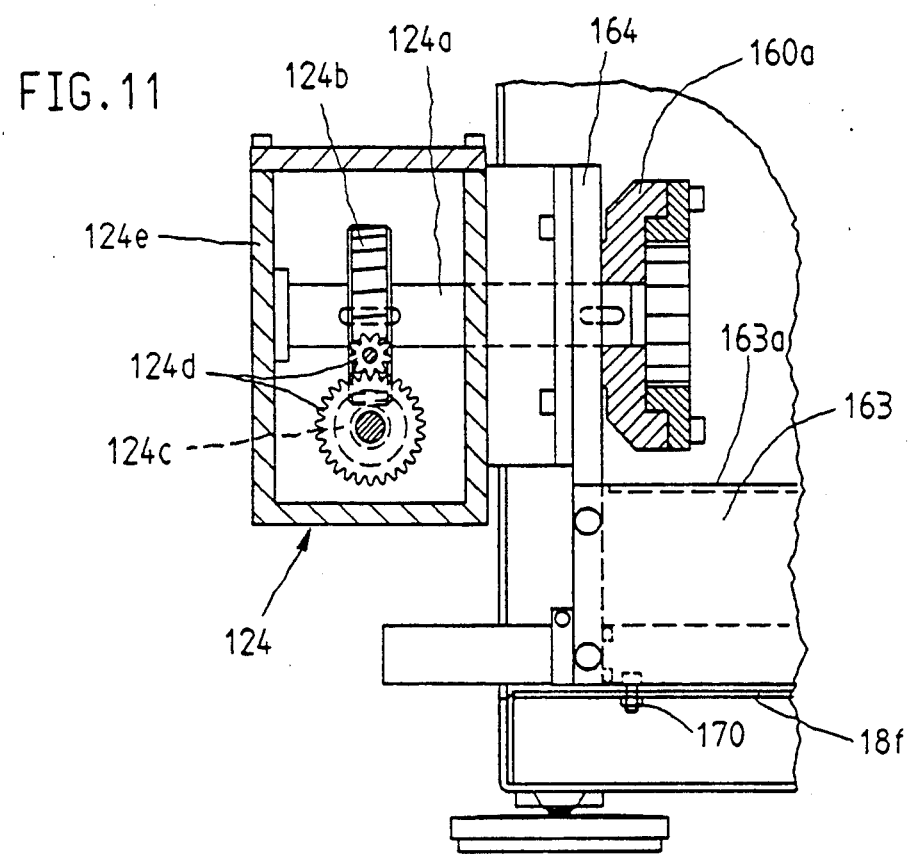
FIG. 11 is a view which is similar to FIG. 5 and shows the motor-transmission unit partly cut open.
Figure 12:
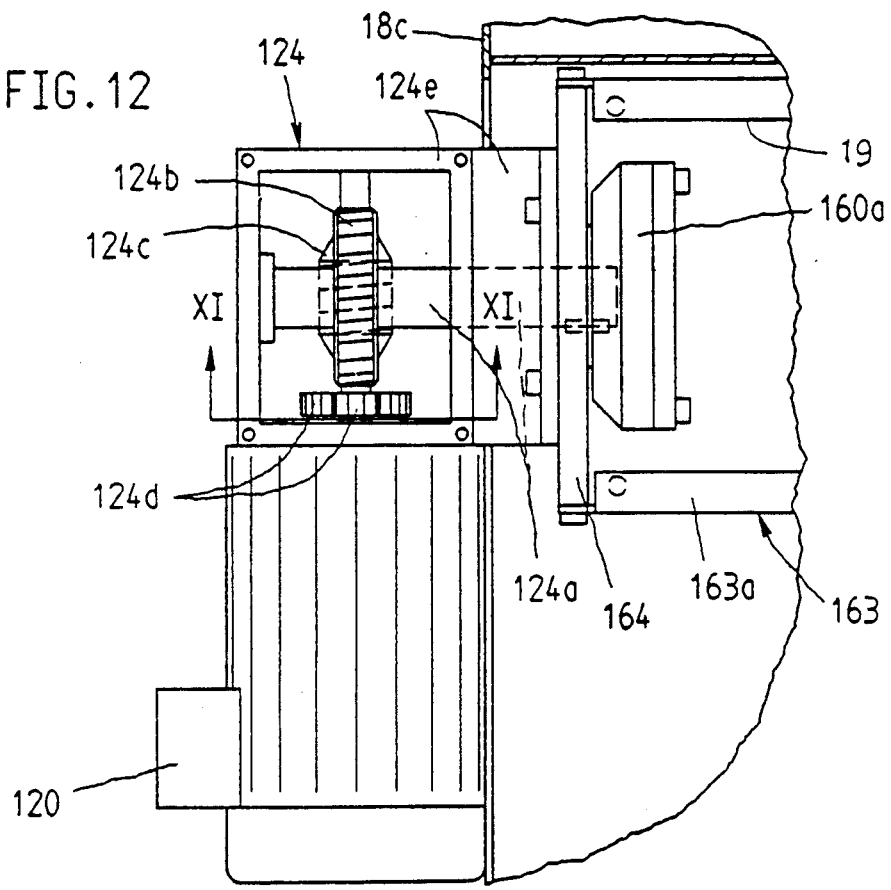
FIG. 12 is a top plan view showing the motor-transmission unit of the disintegrator.

The following special features are embodied in the first illustrative embodiment shown in FIGS. 1 to 9:

A belt conveyor 17 for conveying the moldings 73 on a path which is parallel to the plane of symmetry b—b is associated with the sorting unit. The belt conveyor 17 and its frame 17b are incorporated in a unit which can be removed from and inserted into the machine pedestal M. The disintegrator is composed of a motor-transmission unit A and a cutting mechanism, which is incorporated in a cutting unit G. When the fixing screws 170 have been loosened, the motor-transmission unit can be removed from the machine pedestal through the first exit opening 10 or the second exit opening 76. The cutting mechanism is detachably coupled to the motor-transmission unit A by a plug coupling. When a locking screw 169 (FIG. 5) has been loosened, the cutting unit G can axially be moved and the cutting mechanism will thus automatically be uncoupled from the motor-transmission unit A. In the illustrative embodiment shown in FIGS. 1 to 12 the motor-transmission unit comprises a motor-transmission block which and is supported by a leg 163 on a bottom plate 18f of the machine pedestal M. As particularly well seen in FIG. 5, the motor-transmission block passes through an aperture of the longitudinal side wall 18c of the pedestal M and is, to a substantial extent, situated externally of the pedestal M. During the uncoupling movement of the cutting unit G, the latter is guided on the leg 163. The cutting unit G can be centered on and locked to the leg 163 in working position. The motor-transmission block comprises a motor 120, the axis of which is at right angles to the shaft 131 of the cutting mechanism, and a transmission 124, which comprises a housing 124e, which contains a worm gear train having an output shaft 124a, which is coaxial to the drive shaft 131 of the cutting mechanism and is non-rotatably connected to a coupling socket 160a. The shafts 124a and 131 are oriented perpendicularly to the vertical longitudinal plane of symmetry b—b of the injection molding machine. The drive shaft 131 of the cutting mechanism is terminated by a gear 160b, which constitutes a male coupling member, which is slidably mounted in and peripherally interlocks with an internal gear of the coupling socket 160a (FIGS. 5, 11, 12). The worm 124c is driven via gears 124d. The worm wheel 124b is secured to the output shaft 124a.

As is particularly apparent from FIGS. 5 to 7 and 11 the leg 163 is U-shaped in a top plan view and has in-turned horizontal top flanges providing rail like supporting surfaces 163a. The cutting unit G comprises crossbeams 165, which are supported on and axially guided by the supporting surfaces 163a. The crossbeams 165 have vertical guide edges 20 (FIGS. 5 to 7), which slide on cut vertical edges 19 (FIGS. 6, 7, 12) of the sheet metal leg 163 (FIGS. 5, 6). The cutting unit can be secured by a fixing bar 166 and a screw to a stationary mounting bar 163b, which is secured to the leg 163. This is particularly apparent from FIGS. 4, 5.

The cutting unit G is centered in working position by centering pins 167, which are secured to that crossbeam 165 of the cutting unit G that is nearer to the transmission, and to the mounting bar 163b. The centering pins 167 extend into centering bores of a centering bar 168 or of the mounting bar 163b. As the container 161 is slidably inserted, a tubular port 162a of the container 161 is sealingly introduced into a suction pipe 162, which is secured to the motor-transmission unit A. To produce a vacuum which is sufficient for a sucking of the disintegrated material, the interior spaces of the cutting unit G and of the container 161 for disintegrated material constitute a common evacuated space, which is reasonably sealed by means of strip-shaped cover plates 171, the crossbeam 165, the mounting bar 163b and a stiffening bar 163c.

The motor-transmission block and the leg 163 of the motor-transmission unit A are interconnected by means of a vertical mounting plate 164 (FIG. 8), which is contained in and interlocks with the channel-shaped leg 163 so that the edges of the plate 164 engage the web and legs of the leg 163. The motor-transmission block is carried by and protrudes from the mounting plate 164.

Adjacent to the disintegrator the longitudinal wall 18c of the machine pedestal M is formed with an exit opening 10, through which the cutting unit G and the leg 163 of the motor-transmission unit A can be removed out of the machine pedestal M when the fixing screws 170 have been loosened. The unit which comprises the belt conveyor 17 and the frame 17b can be removed from the machine pedestal M through the first exit opening 76 at the end of the machine pedestal M (FIGS. 1, 3). When the unit comprising the belt conveyor 17 has been removed the sorting unit E can also be removed as an independently operable unit through the first exit opening 76 or through the second exit opening 10 that is formed in the longitudinal wall 18c.

The cutting unit G is designed to operate at a speed of 20 to 25 revolutions per minute. Two large cutters 130a for crushing large plastic pieces and also small cutters 130b are mounted on the drive shaft 131 of the cutting mechanism. The distance from each large cutter 130a to the adjacent bearing flange 128a equals the distance by which the large cutters 130a are spaced apart. All cutters 130a and 130b cooperate with stationary knife edges of diametrically arranged cutter blocks 133.

As the cutters 130a, 130b rotate, they move through annular grooves formed in the stationary cutter blocks.

The material which has been crushed, disintegrated and ground by the cutting mechanism flows into the container 161 for disintegrated material and is sucked off from there through the suction pipe 162, which applies a vacuum to the container 161.

In the embodiment shown in FIGS. 1 to 9 the swivel shaft 35 of the sorting unit E and the drive shaft 131 of the cutting unit G extend at right angles to the plane of symmetry b—b. The belt conveyor 17 conveys the usable moldings 73 parallel to the plane of symmetry b—b and can be removed from the machine pedestal through the first exit opening 76 provided at the end of the machine pedestal. The cutting unit G is symmetrical to the plane of symmetry b—b and can be removed out of the machine pedestal M through the second exit opening 10 formed in the longitudinal wall 18c. The motor-transmission block of the motor-transmission unit A is disposed outside the machine pedestal M.

In series production the injection molding machine can be delivered in the arrangement shown in FIGS. 1 to 9 as desired without an appreciable additional expenditure. The sorting unit is locked in position in that the supporting elements 74 are received by apertures formed in the supporting flange 36 l or in the supporting means of the section rails 36i". When it is desired to remove the sorting unit E the latter is slightly off the supporting elements and is then first moved away from the supporting elements 74 in a direction which is parallel to the plane of symmetry b—b and is subsequently removed out of the machine pedestal M through the exit opening 76 or 10. The cutting mechanism is symmetrical to the center plane a—a (FIG. 9) of the sorting unit E so that the disintegrator has a simple design and the sorting unit and the disintegrator can be accommodated in a small space in such a manner that the rejects and sprues can directly fall from the swivel plate 36 into the cutting mechanism without a need for a transverse conveyance of the rejects and sprues from the sorting means.

I claim:

1. In an injection molding machine having a vertical longitudinal plane of symmetry and including
 an injecting unit,
 a clamping unit comprising an injection mold for consecutively ejecting usable moldings, rejects and sprues,
 a machine pedestal having a substantially rectangular vertical projection and supporting said injecting and clamping units,
 sorting means comprising a swivel plate disposed under said mold; said swivel plate being pivotally movable about a horizontal axis; said swivel plate being arranged to receive said moldings and said sprues from said mold; said swivel plate being movable between first and second, oppositely downwardly inclined positions for delivering in said first position said usable moldings on one side of said horizontal axis and for delivering in said second position said rejects and sprues on another side of said horizontal axis,
 receiving means extending under said swivel plate for receiving said usable moldings therefrom when said swivel plate is in said first position and
 a disintegrator comprising a cutting mechanism arranged to receive said rejects and sprues from said swivel plate when said swivel plate is in said second position; said cutting mechanism being operable to disintegrate said rejects and sprues to form disintegrated material; said disintegrator further having a transmission connected to said cutting mechanism, a drive motor operatively connected to said cutting mechanism through said transmission, and means for receiving said disintegrated material from said cutting mechanism;
 the improvement wherein
 said machine pedestal has first and second opposite longitudinal side walls;
 an exit opening in the first side wall adjacent to said cutting mechanism;
 said cutting mechanism comprising
 at least two axially spaced-apart first cutters for crushing large plastic parts,
 a plurality of axially spaced-apart second cutters; said second cutters being smaller than said first cutters;
 a rotary shaft carrying the first and second cutters; said rotary shaft being oriented perpendicularly to said vertical longitudinal plane of symmetry,
 a plurality of pairs of diametrically opposite, stationary cutting edges; each of the first and second cutters cooperating with the stationary cutting edges;
 said motor and said transmission forming a motor-and-transmission block;
 said sorting means being formed as an independently operable unit including a housing;
 the improvement further comprising
 a leg structure supported on said bottom structure of the machine pedestal; said motor-and-transmission block being supported on said leg structure; said leg structure and said motor-and-transmission block forming a motor-and-transmission unit; said motor-and-transmission block projecting through an aperture of said second longitudinal side wall and having a major part situated externally of said substantially rectangular vertical projection of said machine pedestal;
 a cutting unit incorporating said cutting mechanism and being lockably mounted on said leg structure; said cutting unit being slidable on said leg structure for removal out of said machine pedestal through said exit opening in the first side wall; said cutting unit having a vertical projection; said motor-and-transmission block being situated outside an area defined by said vertical projection of said cutting unit; and
 a plug means for operatively coupling said transmission to said cutting unit; said plug means being arranged for disengaging said transmission from said cutting unit as said cutting unit is removed out of said machine pedestal through said exit opening.

2. An injection molding machine as defined in claim 1, wherein
 said sorting unit has a vertical longitudinal center plane,
 said cutting unit being symmetrical to said vertical longitudinal center plane of said sorting unit.

3. An injection molding machine as defined in claim 1, wherein
 said cutting mechanism comprises a drive shaft projecting toward said transmission and having an outer end provided with a coupling gear,
 said transmission comprising a worm gear train including a worm wheel and an output shaft nonrotatably connected to said worm wheel; said output shaft being coaxial to and directed toward said drive shaft, and
 a coupling socket non-rotatably connected to said output shaft; said coupling socket having an internal gear axially slidably mounted on and peripherally interlocked with said coupling gear.

4. An injection molding machine as defined in claim 1, wherein
 said cutting unit comprises two bearing flanges in which said drive shaft is rotatably mounted and each of the bearing flanges is spaced a predetermined distance from an adjacent one of said first cutters, and
 adjacent ones of said first cutters are spaced said predetermined distance apart.

5. An injection molding machine as defined in claim 4, wherein said motor and said transmission are operable to rotate said drive shaft at a speed of 20 to 25 rotations per minute.

6. An injection molding machine as defined in claim 1, wherein
 said swivel plate has a major portion extending above said horizontal axis,
 an angle plate being provided under said horizontal axis and comprising two legs sloping downwardly on opposite sides of said horizontal axis, and
 each of said legs being disposed adjacent to a lower end of said plate and aligned with a top surface thereof when said plate is in one of said first and second positions.

7. An injection molding machine as defined in claim 6, wherein said housing of said sorting unit comprises two parallel vertical side walls formed with swivel bearings, section rails connecting said walls at a top thereof and an angle plate connecting said side walls at a bottom thereof, said swivel plate being pivoted in said swivel bearings, a plurality of stationary supporting elements being supported by said machine pedestal, and said side walls being provided with laterally outwardly protruding horizontal supporting flanges resting on said stationary supporting elements.

8. An injection molding machine as defined in claim 1, further comprising an independently operable conveyor unit comprising a conveyor belt constituting said receiving means and extending from an interior of said machine pedestal through one of the side walls and is operable to convey said usable moldings through said one side wall along a path parallel to said plane of symmetry, said conveyor unit being removable from said machine pedestal through one of the side walls.

9. An injection molding machine as defined in claim 8, wherein said conveyor unit comprises a frame including two horizontally spaced-apart, parallel vertical guide plates and crossplates connecting said guide plates, said conveyor belt being supported by horizontal rods, and said crossplates being slidably mounted in said machine pedestal to permit a limited displacement of said frame in said machine pedestal.

10. An injection molding machine as defined in claim 1, wherein said sorting means is detachably mounted to said pedestal for removal therefrom as a unit.

11. In an injection molding machine including an injecting unit, a clamping unit comprising an injection mold for consecutively ejecting usable moldings, rejects and sprues, a machine pedestal having a substantially rectangular vertical projection and supporting said injecting and clamping units, sorting means comprising a swivel plate disposed under said mold and pivotally movable about a horizontal axis; said swivel plate being arranged to receive said moldings and said sprues from said mold; said swivel plate being movable between first and second, oppositely downwardly inclined positions for delivering in said first position said usable moldings on one side of said axis and for delivering in said second position said rejects and sprues on another side of said axis, receiving means extending under said swivel plate for receiving said usable moldings therefrom when said swivel plate is in said first position and a disintegrator comprising a cutting mechanism arranged to receive said rejects and sprues from said swivel plate when said swivel plate is in said second position; said cutting mechanism being operable to disintegrate said rejects and sprues to form disintegrated material; said disintegrator further having a transmission connected to said cutting mechanism, a drive motor operatively connected to said cutting mechanism through said transmission, and a container for receiving said disintegrated material from said cutting mechanism;

the improvement wherein said machine pedestal has a bottom structure;

said cutting mechanism comprising a drive shaft projecting toward said transmission and having an outer end provided with a coupling gear, said transmission comprising a worm gear train including a worm wheel and an output shaft nonrotatably connected to said worm wheel; said output shaft being coaxial to and directed toward said drive shaft, and a coupling socket non-rotatably connected to said output shaft; said coupling socket having an internal gear axially slidably mounted on and peripherally interlocked with said coupling gear;

said motor and said transmission forming a motor-and-transmission block;

said sorting means being formed as an independently operable unit, said sorting means including a housing and being detachably mounted to said pedestal for removal therefrom as a unit;

the improvement further comprising a leg structure supported on said bottom structure of the machine pedestal; said motor-and-transmission block being supported on said leg structure; said leg structure and said motor-and-transmission block forming a motor-and-transmission unit; and a cutting unit incorporating said cutting mechanism and being lockably mounted on said leg structure; said cutting unit being slidable on said leg structure for removal out of said machine pedestal; said cutting unit having a vertical projection; said motor-and-transmission block being situated outside an area defined by said vertical projection of said cutting unit.

* * * * *